US012421925B2

(12) United States Patent
Johnson

(10) Patent No.: US 12,421,925 B2
(45) Date of Patent: Sep. 23, 2025

(54) METHOD AND ASSEMBLIES FOR REPAIR OF PLASTIC FUEL LOCK RING AND FUEL SUPPLY LINE

(71) Applicant: Eric Johnson, Flushing, MI (US)

(72) Inventor: Eric Johnson, Flushing, MI (US)

( * ) Notice: Subject to any disclaimer, the term of this patent is extended or adjusted under 35 U.S.C. 154(b) by 889 days.

(21) Appl. No.: 16/874,754

(22) Filed: May 15, 2020

(65) Prior Publication Data

US 2020/0362803 A1 Nov. 19, 2020

Related U.S. Application Data

(60) Provisional application No. 62/849,430, filed on May 17, 2019.

(51) Int. Cl.

*F02M 37/10* (2006.01)
*F02M 37/00* (2006.01)
*F02M 37/42* (2019.01)

(52) U.S. Cl.

CPC ...... *F02M 37/103* (2013.01); *F02M 37/0017* (2013.01); *F02M 37/0052* (2013.01); *F02M 37/42* (2019.01)

(58) Field of Classification Search

CPC ........... F02M 37/0017; F02M 37/0052; F02M 37/103; F02M 37/42
USPC ................ 123/497, 505, 509, 519; 248/674; 285/308; 137/351, 565.01
See application file for complete search history.

(56) References Cited

U.S. PATENT DOCUMENTS

| | | | | |
|---|---|---|---|---|
| 5,049,158 A * | 9/1991 | Engelhardt | A61F 2/34 | 623/22.25 |
| 5,207,463 A * | 5/1993 | Seizert | B60K 15/01 | 220/298 |
| 5,423,702 A * | 6/1995 | Butler | B63B 11/04 | 440/88 F |
| 5,951,050 A * | 9/1999 | Siekmann | F02M 37/106 | 280/830 |
| 6,533,288 B1 * | 3/2003 | Brandner | B60K 15/03177 | 292/307 R |
| 6,704,501 B1 * | 3/2004 | Washisu | G03B 5/00 | 396/55 |
| 8,057,122 B2 * | 11/2011 | Schneider | F16B 41/002 | 411/107 |
| 10,532,699 B2 * | 1/2020 | Fais | F16M 13/022 | |
| 10,823,222 B2 * | 11/2020 | Hübner | F16B 5/0258 | |
| 2002/0108658 A1 * | 8/2002 | Ootaka | B62J 35/00 | 137/565.17 |
| 2004/0021271 A1 * | 2/2004 | Tratnik | F02M 37/103 | 277/616 |
| 2004/0245253 A1 * | 12/2004 | Zdroik | B65D 88/10 | 220/300 |
| 2007/0062841 A1 * | 3/2007 | Nakamura | B60K 15/03177 | 206/562 |

(Continued)

*Primary Examiner* — Logan M Kraft
*Assistant Examiner* — Johnny H Hoang
(74) *Attorney, Agent, or Firm* — Dinsmore & Shohl LLP

(57) ABSTRACT

A method of installation and kits for replacing a lock ring securing a fuel pump to a gas tank and a kit for replacing a fuel supply system of an automotive vehicle. The kit for replacing the lock ring including a circular body having a plurality through bores and a plurality of self-tapping fasteners. The kit for replacement of a fuel supply line including a fuel filter having circular beads on the inlet and outlet. The kit further including a pair of quick disconnect fittings for engaging the beads of the fuel filter.

6 Claims, 6 Drawing Sheets

(56) References Cited

U.S. PATENT DOCUMENTS

| | | | | |
|---|---|---|---|---|
| 2009/0184118 | A1* | 7/2009 | Kobayashi | F02M 37/103<br>220/62.22 |
| 2009/0242300 | A1* | 10/2009 | Mizukura | B62K 11/04<br>123/195 C |
| 2010/0051621 | A1* | 3/2010 | Shimoda | B60K 15/03177<br>220/300 |
| 2011/0139128 | A1* | 6/2011 | Zhang | F02M 37/106<br>123/509 |
| 2012/0222655 | A1* | 9/2012 | Powell | F02M 37/103<br>123/509 |
| 2014/0312613 | A1* | 10/2014 | Gaffi Eld | B60K 15/03<br>285/308 |
| 2017/0087979 | A1* | 3/2017 | Beauchaine | B60K 15/01 |
| 2017/0298879 | A1* | 10/2017 | Ishiyama | F02M 37/007 |
| 2020/0370548 | A1* | 11/2020 | Chady | F04B 53/22 |

* cited by examiner

METHOD AND ASSEMBLIES FOR REPAIR OF PLASTIC FUEL LOCK RING AND FUEL SUPPLY LINE

CROSS-REFERENCE TO RELATED APPLICATIONS

This application claims the benefit of U.S. Provisional Application 62/849,430 filed on May 17, 2019.

FIELD OF THE INVENTION

A method and kits for the repair of automotive fuel supply systems, and more particularly kits for the replacement of fuel pump lock rings and fuel lines

BACKGROUND OF THE INVENTION

Automotive fuel supply systems have a number of metal components which oxidize and corrode with time. These parts include a fuel pump, locking ring, and fuel filter. Eventually these parts may need replacement. Because these parts may be corroded and rusted to other parts, it may be difficult to replace the parts without replacing other adjacent parts.

Fuel pumps are frequently mounted directly to gas tanks. Many fuel systems have gas tanks formed of plastic. The gas tanks have a large aperture at the top to receive the fuel pump 112. The fuel pump 112 has a base portion with a flange extending a round circumference. As shown in FIG. 3, the top of fuel tank is provided with metal tabs 114 which are positioned radially outwardly from the aperture to engage a metal lock ring 116. The lock ring 116 is mounted over the flange of the fuel pump assembly. Slots are positioned between the inner and outer edges of the ring to receive the metal tabs 114. Recesses 118 are formed on the outer edge of the ring receive a lock 120. The lock ring 116 is rotated to engage the tabs 114 and lock 120. The metal tabs 114 and lock 120 frequently corrode, such that the ring 112 cannot be removed without destroying the tabs 114. Thus, it is necessary to replace the gas tank when replacing a fuel pump.

The fuel systems also include fuel lines which include filters which are coupled to fuel lines with threaded metal fittings. The fuel lines are secured to the vehicle with fasteners. These fittings and fasteners frequently corrode. Thus, when replacing a fuel filter or fuel line, it is necessary to remove the entire fuel line. The fuel line includes tubing, and a number of fittings which must be installed on the ends of the tubing. Current replacement kits include fuel filters having threaded ends which engage threaded fittings. Thus, it is quite time consuming to replace the fuel lines.

SUMMARY OF THE INVENTION

A repair kit for use in securing a fuel pump to a fuel tank, having a ring and a plurality of fasteners. The ring includes a top surface and a bottom surface, the top surface and the bottom surface extending between an outer edge and an inner edge, the inner edge defining an aperture adapted to receive a portion of the fuel pump; and a plurality of fasteners having threads for engaging the fuel tank. Each of the fasteners may have a hexagonal head and a self-tapping thread. A further feature is that the top surface of the ring may have a pair of alignment lines, each of the lines extending radially and spaced apart at an angle of between 70° and 90.

Another embodiment includes a kit for replacement of a fuel line and filter of an automotive fuel system; the kit includes; a mainline having a pair of ends; a quick connect fitting mounted to one end of the main line; a return line having a pair of ends; a quick connect fitting mounted to one end of the fuel line; and a fuel filter having a pair of conduits, each of the conduits having a circumferential bead adapted to be received in one of quick connect fitting of the main line and the return line.

The kit may further include a vent line. The kit may further include a heat resistant loom adapted to be received over the main line as well as a loom for extending over the return line. The kit may also include a connector mounted to another end of the return line adapted to be connected to a fuel pump.

A method of replacing a fuel pump on a gas tank, the fuel pump being mounted to the gas tank by a lock ring engaging a plurality of tabs mounted to the gas tank, the method includes; removing the lock ring and tabs from the gas tank; removing the old fuel pump from the tank; installing the new fuel pump in an aperture in the fuel tank; inserting fasteners through a through bore in the ring; and driving the fasteners into the gas tank.

BRIEF DESCRIPTION OF THE DRAWINGS

A For a detailed description of the preferred embodiments of the invention reference will now be made to the accompanying drawings, in which.

DETAILED DESCRIPTION OF THE PREFERRED EMBODIMENTS

Accordingly, a repair kit assembly and the method of installation for a fuel includes a retaining ring which is installed without having to replace the existing fuel tank. Additionally, a replacement kit for fuel lines includes quick connect fittings and a fuel filter adapted to be used without threaded couplers.

Figure 1:
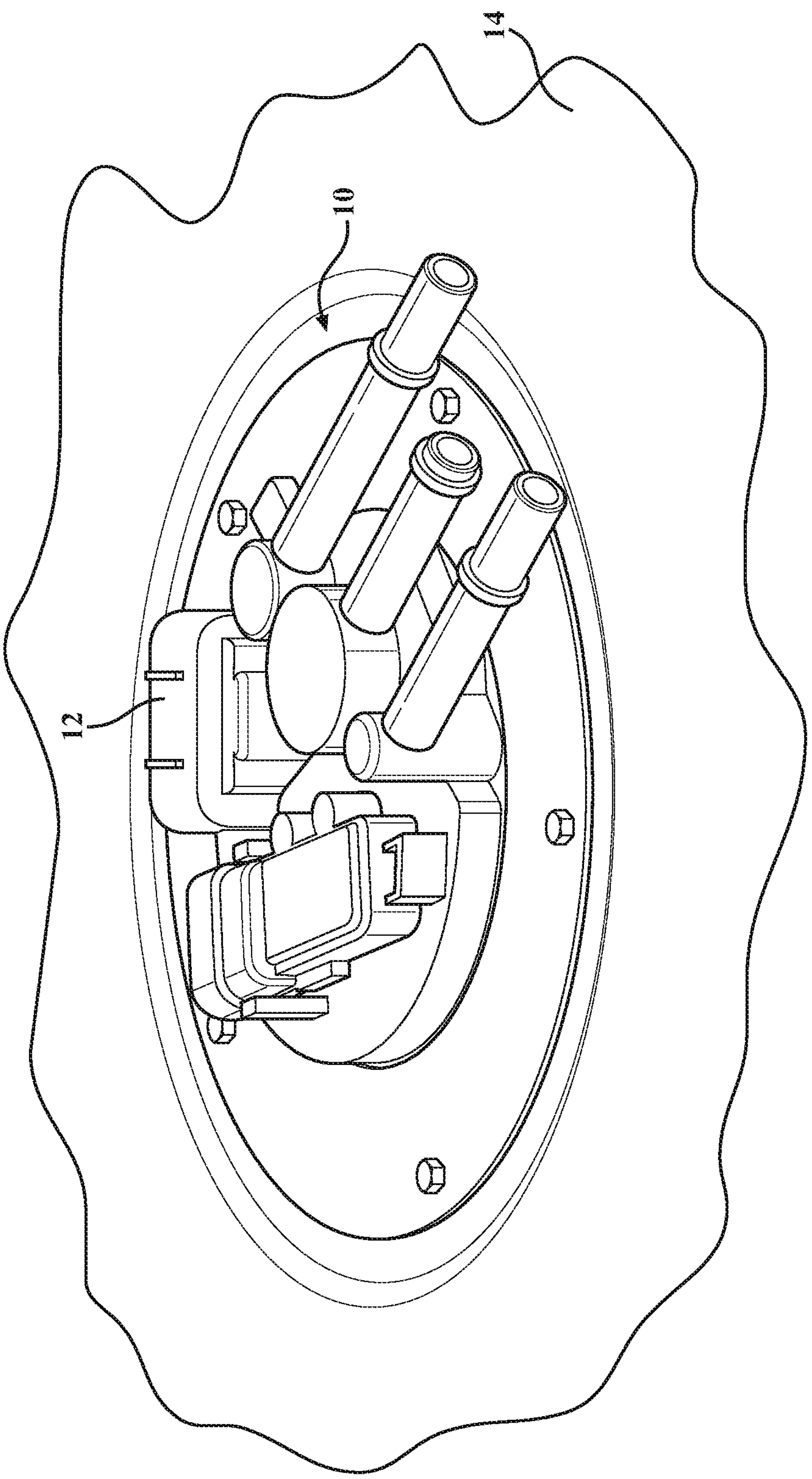
FIG. 1. is a perspective view of a replacement kit for a lock ring showing the ring in position over a fuel pump.
Figure 2:
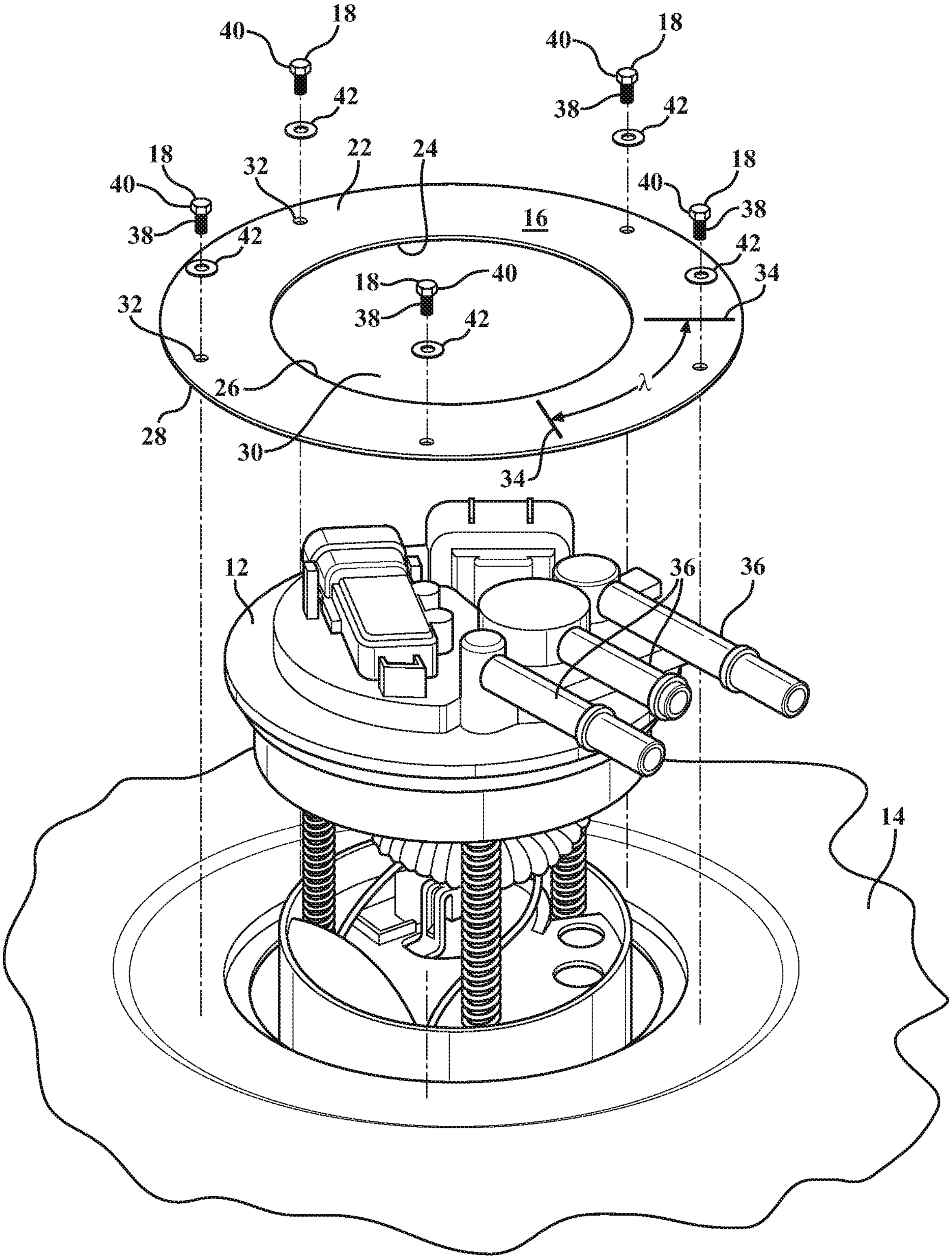
FIG. 2 is a exploded view of a kit for replacement of a lock ring.
Figure 3:
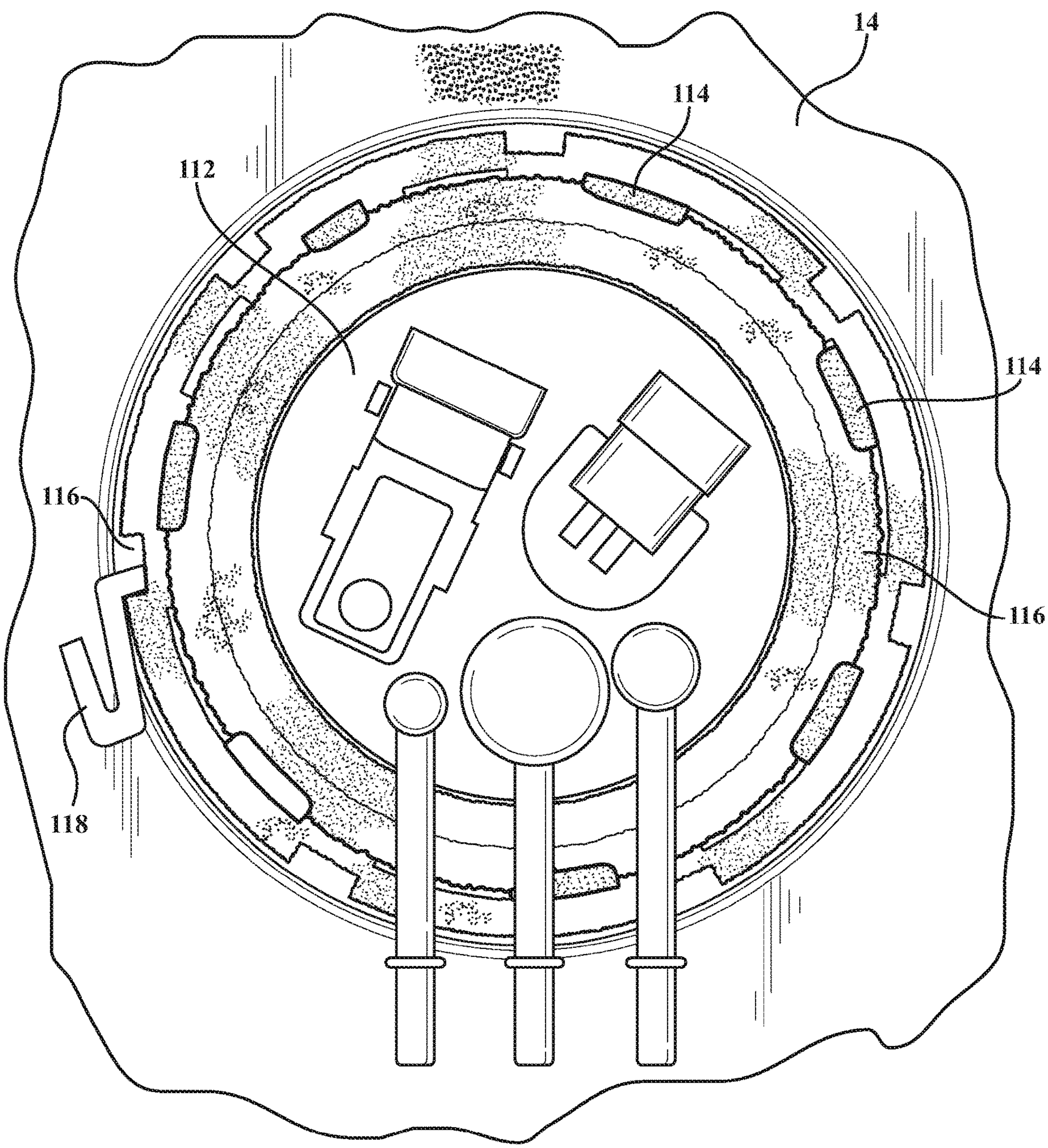
FIG. 3 is a top view of a prior art lock ring securing a fuel pump to a tank.

As shown in FIGS. 1 and 2, a repair kit 10 is provided for replacing a fuel pump 12 on a plastic tank 14. As shown in FIG. 2, the kit 10 includes a retaining ring 16 and a plurality of fasteners 18. The retaining ring 16 has a rigid body 20 with a generally planar top surface 22 and bottom surface 24 which extend between an inner annular edge 26 and an outer edge 28. The inner edge 26 defines a circular opening 30 for receiving the fuel pump 12. A plurality of through bores 32 extend through the body 20. The through bores are located between the edges 26 and 28 so as be over portions of the tank 14 where the remains of the metal tabs are located. The body 20 is made up of soft steel and may be powder coated with a finish which matches the color of the gas tank.

As shown in FIG. 2, the ring 16 may also include a pair of alignment lines 34 which extend radially across the top surface 22 between the edges 26, 28. The alignment lines 34 are separated at an angle (lambda) of approximately 70-80 degrees and are formed of a contrasting color to the finish of the ring. The alignment lines 34 are formed to define an area within which fuel line fittings 36 of the fuel pump 12 must to be located.

Each of the plurality of fasteners 18 have a thread 38 which is adapted for self-tapping into plastic of the gas tank 14. The fasteners 18 are suitable for insertion through the through bores 32. The fastener has a hexagonal head 40 for use with an air ratchet. Each fastener 18 is inserted through a steel or rubber washer 42. The head 40 of the fastener 18 may have a flange (not shown) which engages the top surface 22 of the retaining 16 ring during insertion. The flange deforms to indicate that a pre-determined amount of torque has been reached during installation to prevent stripping of the threats cut into the tank 14.

Figure 4:
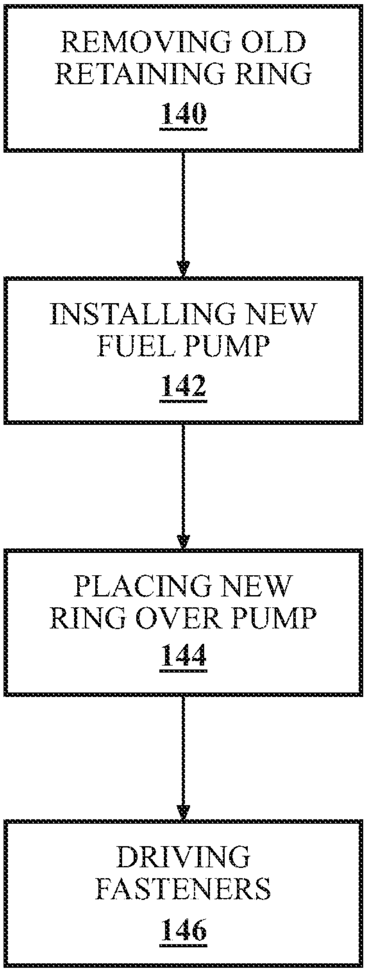
FIG. 4 is a flow chart showing the steps in the method of replacing the lock ring.

As shown in FIG. 4, the method of installing the new fuel pump includes the steps of first 140 removing the old lock ring and fuel pump from the gas tank. The replacement may be made in many cars without removing the tank by accessing through the fuel pump access located in the trunk. If the old lock ring has greatly deteriorated, it must be pried off and removed in pieces. Care should be taken to not displace any debris into the tank. After the old pump is removed, all remaining tabs holding the old lock ring may be removed by using side cutters or pliers. The tabs should be removed so that they are flush with the tank.

The next step 142 is seating an O-ring on the aperture of the tank and then inserting a new fuel pump 12 into the aperture in the tank 14. A small amount of grease can be used to hold the O ring in place while repositioning the fuel pump 12. Generally, the fuel pump will have a protrusion which will be received in a notch of the tank to properly align it. The tab and the pump must be firmly seated into the notch to seal properly.

Figure 5:
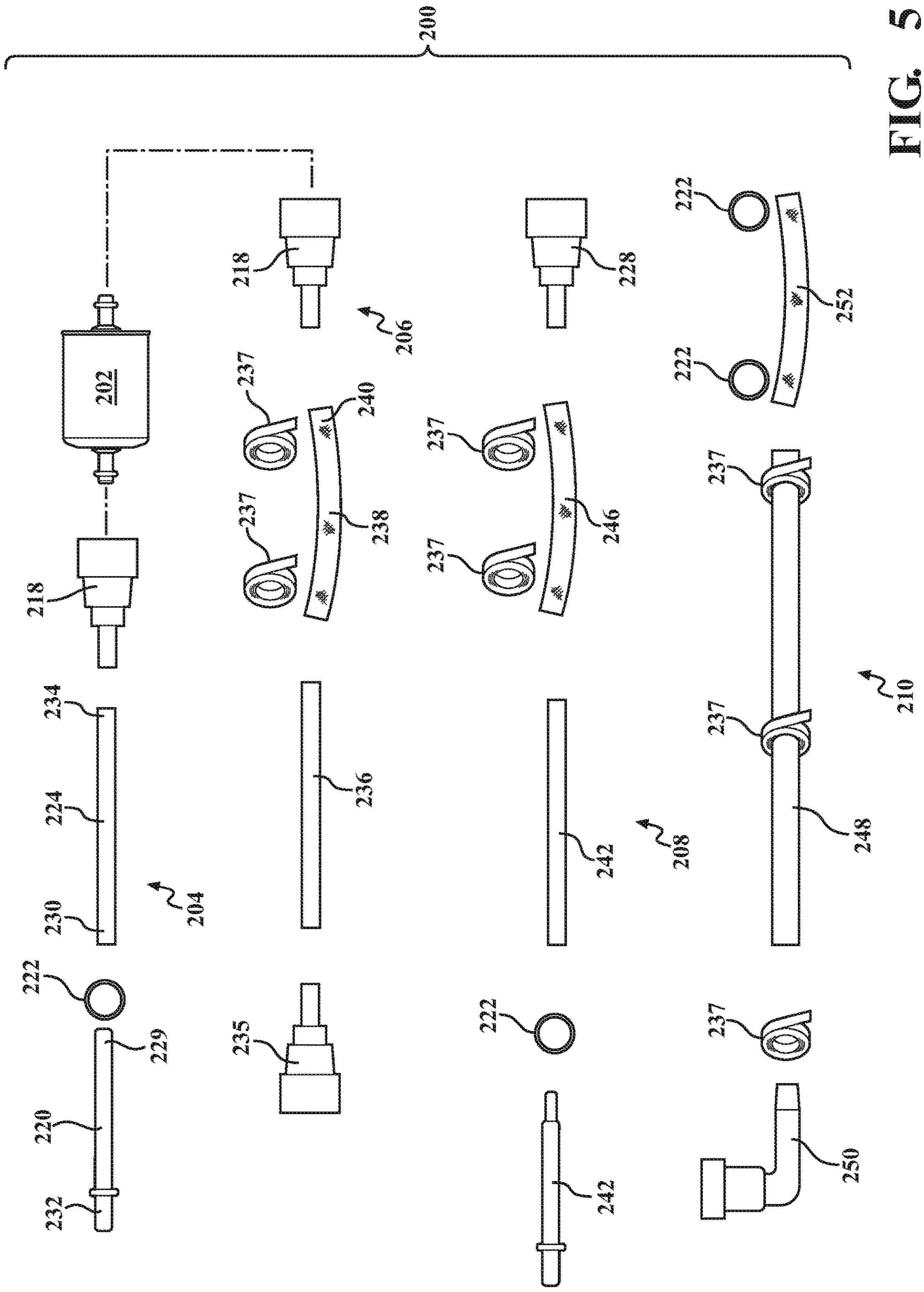
FIG. 5 is a top view of an alternative replacement kit for replacing a fuel supply system.
Figure 6:
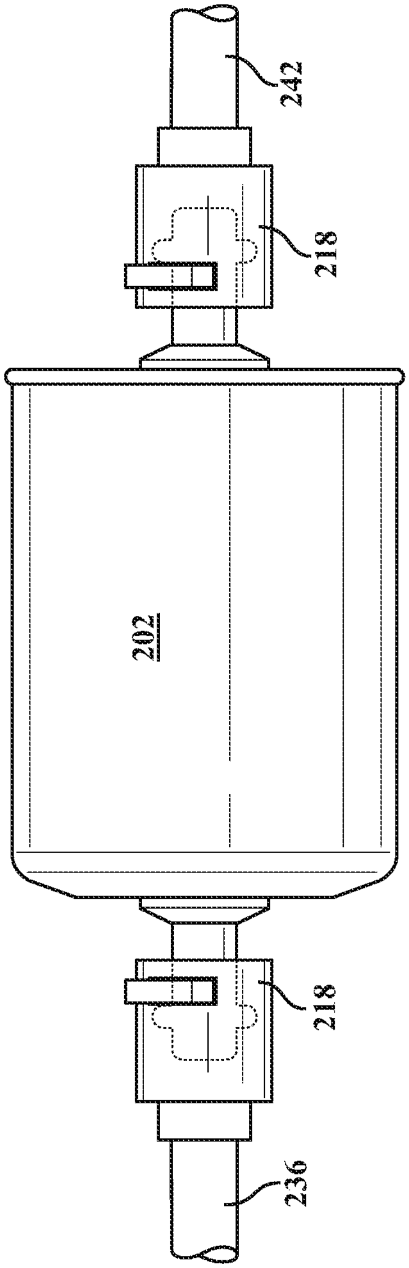
FIG. 6 is a side perspective view of a fuel filter connected to quick disconnect fittings of the alternative embodiment.
Figure 7:
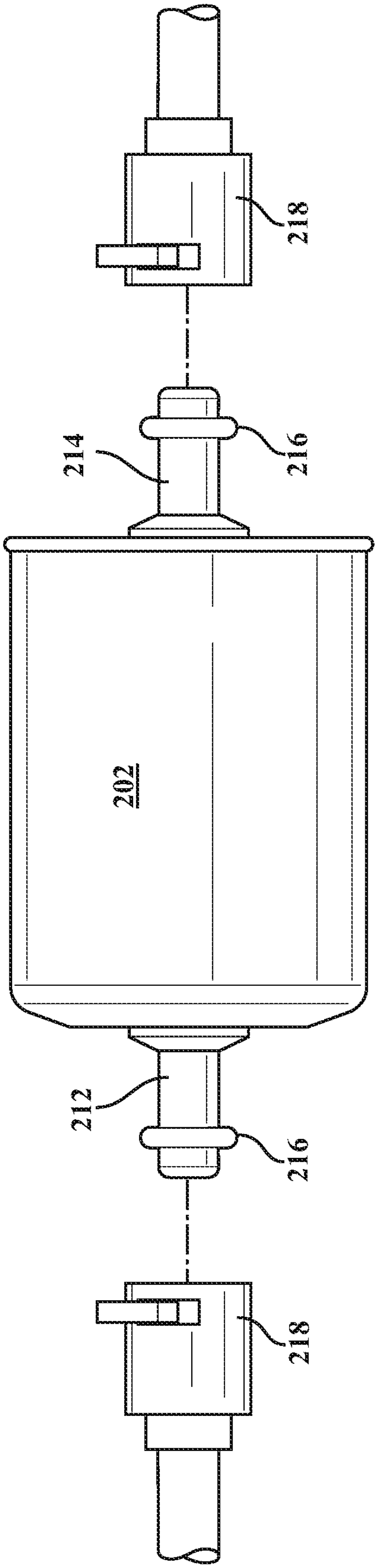
FIG. 7 is a side perspective exploded view of the fuel filter and quick disconnect fittings of the alternative embodiment.

The next step 144 is placing the retaining ring 16 over the new fuel pump 12. The fuel line fittings 36 of the pump should be kept between the alignment lines. The last step 146 is driving 106 the fasteners 18 through the through bores into the gas tank 14. A dab of a non-hardening sealant such as Permatex 2 can be placed on the threads of each fastener. A ¼" air ratchet or a hand operated nut drive can be used to drive the fasteners into the tank 14. The screws are driven until they just touch the retaining ring 16. After all of the screws are in position, they should be tightened to about 10 foot pounds of torque being careful not to over tighten and strip out the threads. The installation is completed by connecting all of the lines and electrical connections to the fuel pump As shown in FIG. 5, a replacement kit 200 for automotive fuel line systems includes a filter 202, parts for forming a filter line 204, fuel line 206, return line 208 and a vent line 210. Advantageously, as shown in FIGS. 6 and 7, the fuel filter is of a proper size to service the fuel supply system of the vehicle. The filter 202 has an inlet 212 and outlet 214 each having an annular bead 216 encircling a conduit. Each bead 216 is positioned to engage a quick connect fitting 218. The quick connect fittings permit simple and fast connection of the filter line 204 and the fuel line 206 to the fuel filter 202.

The replacement kit 200, shown in FIG. 5, is an exemplary embodiment of the replacement kit is provided for replacement of a General Motors fuel supply system. Kits for other vehicles may vary with respect to certain components, however the use of a quick connect fittings with a fuel filter is common to all embodiments.

The filter line 204 includes an end fitting 220, a squeeze clip 222, a length of flexible tubing 224, and a quick connect fitting 228. The end fitting is a rigid plastic tube. One end 229 of the end fitting 220 is suitable for insertion into one end 230 of the tubing 224. The squeeze clip 222 is provided to be place about the end 230 of the tubing 224 to secure the tubing on the end 230. The other end 232 of the end fitting 220 is adapted for attachment to the fuel tank. The tubing 224 is formed of a suitable material such as nylon and has the same inner diameter as the original filter line. The length of the tubing vary with the vehicle and must be trimmed to size. An exemplary filter line 204 has a diameter of ⅜" and a length of 17.5". The quick connect fitting 228 is provided for connecting another end 234 of the tubing 224 to the fuel filter 202. An exemplary size for the quick connect fitting 218 is ⅝"×5⁄16".

The main fuel line 206 includes a length of flexible tubing 236, a loom 238, the quick connect fitting 218 and a quick connect fitting 235. A suitable length of tubing 236 is ⅜" in diameter and 128" long. The loom 238 is cylindrical and is formed to slide over a portion of the tubing 236. The loom 238 is formed of a heat reflective material such as nylon to protect the tubing from heat of a transmission. The loom 238 is positioned over the tubing 236 and adhesive tape 237 is provided to hold the loom 238 in position. The quick connect fitting 218 is inserted in one end 240 of the fuel line 206. In a preferred embodiment the quick connect fitting 218 is ⅜"×5⁄16". The quick connect fitting is provided to connect one end 240 the main fuel line to the fuel filter 202. The other end of the fuel line is connected to the motor (not shown) by quick connect fitting 235.

The return line 208 includes a length of nylon tubing 242, another quick connect fitting 218, a plastic connector 244, and a loom 246. The length of nylon tubing 242 is 5⁄16" diameter×12' long. The loom 246 is 24" long and is provided for protecting a portion of the nylon tubing 242 from heat. The quick connect fitting 218 is 5⁄16"×5⁄16" and provided for attachment to the fuel tank. The metal connector 244 is provided for connection to the fuel pump. A spring clip 222 is provided to secure the tubing 242 to the connector 244.

The vent line 210 includes a length of nylon tubing 248, an end fitting 250 and a hose 252. The end fitting 250 is a 90° fitting is provided for attachment of one end of the tubing 248 to a charcoal canister. The hose 252 is 4" in length and provided to connect the other end of the tubing 248 to a Shrader valve. Spring clips 222 are provided to secure the ends of the hose 252. Wire ties, instructions and tags (not shown) may be provided to secure the lines to the vehicle.

Thus, disclosed are replacement kits for the replacement of automotive fuel supply systems. The systems are particularly useful for replacement of parts which have become corroded. The systems are simply and easily installed.

I claim:

1. A method of replacing a fuel pump on a gas tank, the fuel pump being mounted to the gas tank by a lock ring engaging a plurality of tabs mounted to the gas tank, the method comprising the steps of:

removing the lock ring and tabs from the gas tank;

removing the old fuel pump from the tank;

installing the new fuel pump in an aperture in the fuel tank;

installing the lock ring having a top surface and a bottom surface, the top surface and the bottom surface extending between an outer edge and an inner edge, the bottom surface being planar in shape between the outer edge and the inner edge, the inner edge defining an aperture that receives a portion of the fuel pump, at least a portion of the fuel pump in communication with at least a portion of the inner edge of the ring or a portion of the bottom surface in communication with a portion of the fuel pump, a plurality of through bores extending from the top surface to the bottom surface;

inserting fasteners through the plurality of through bores in the lock ring, each of the fasteners having threads to extend through the through bores; and driving the fasteners into the gas tank to secure the lock ring to the fuel tank.

2. The method of claim 1 wherein the fasteners are self-tapping fasteners which are screwed into the gas tank.

3. The method of claim 1 after the step of removing the old fuel pump including the step of securing an o-ring about an aperture of the fuel tank.

4. The method of claim 1, wherein the bottom surface of the ring is configured to abut a flange of the fuel pump.

5. The method of claim 1, wherein the top surface is planar in shape between the outer edge and the inner edge.

6. The method of claim 1, wherein at least a portion of the bottom surface is configured to be in communication with the fuel tank.

* * * * *